(No Model.)
J. WEYMOUTH.
CULTIVATOR.
No. 260,720. Patented July 4, 1882.
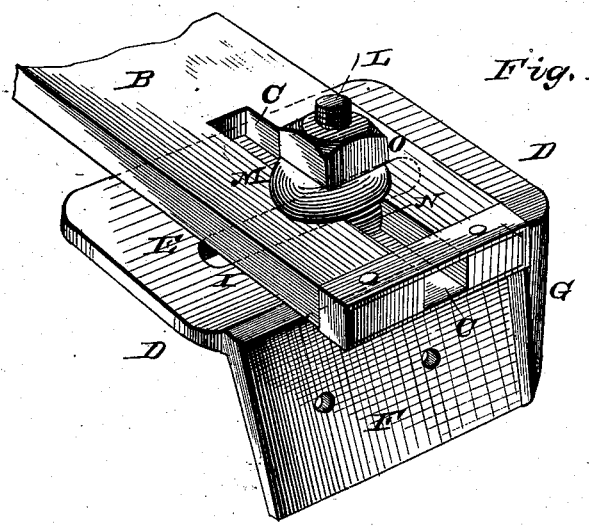
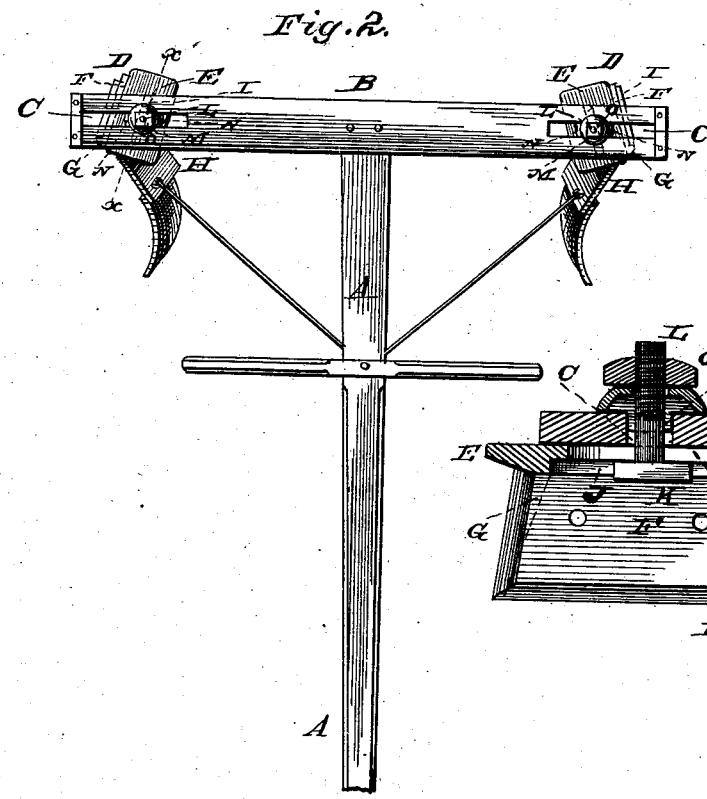
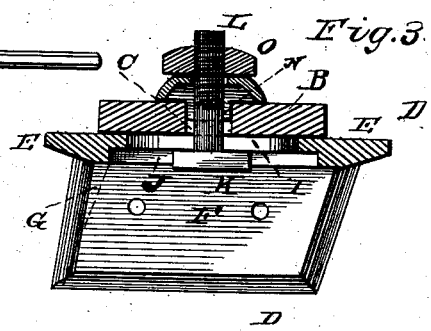
WITNESSES:
Fred. G. Dieterich
P. C. Dieterich
INVENTOR.
John Weymouth
by C. A. Snow & Co.
ATTORNEYS.
N. PETERS, Photo-Lithographer, Washington, D. C.

UNITED STATES PATENT OFFICE.

JOHN WEYMOUTH, OF SANGERVILLE, MAINE.

CULTIVATOR.

SPECIFICATION forming part of Letters Patent No. 260,720, dated July 4, 1882.

Application filed April 21, 1882. (No model.)

To all whom it may concern:

Be it known that I, JOHN WEYMOUTH, of Sangerville, in the county of Piscataquis and State of Maine, have invented certain new and useful Improvements in Angle-Plates for Cultivators; and I do hereby declare that the following is a full, clear, and exact description of the invention, which will enable others skilled in the art to which it appertains to make and use the same, reference being had to the accompanying drawings, which form a part of this specification.

Figure 1 is a perspective view of the angle-plate. Fig. 2 is a top plan of a cultivator having my improved attachment; and Fig. 3 is a section on line $x$ $x$, Fig. 2.

Corresponding parts in the several figures are denoted by like letters of reference.

This invention relates to an improved angle-plate for connecting and properly adjusting the blades of cultivators and horse-hoes to their frames; and it consists in the improved construction of the same, which will be hereinafter fully described, and particularly pointed out in the claim.

In the drawings, A represents the pole, and B the cross-piece, of a cultivator, which is provided at its ends with slots C.

D is the angle-plate, which is made preferably of cast-iron, and consists of the horizontal wing E and a nearly vertical wing, F, which may be at any desired angle to the wing E.

The wing F is provided at its front end with a flange, G, forming a bearing for the front edge of the shank H of the cultivator, which is bolted or otherwise suitably secured to said wing. The wing E has a longitudinal slot, I, and it is provided on its under side with a recess, J, surrounding said slot, to receive the square head K of a bolt, L, which passes through said slot I and through the slot C in cross-piece B.

M is a washer adjusted upon the bolt L, and having nibs or teats N, extending downward into the slot C. O is the nut.

The operation of my invention will be readily understood. When the nut O is tightened the nibs N of washer M and the square bolt-head in the recess J serve to hold the angle-plate immovably in the position to which it may be adjusted in relation to the cross-piece B. By simply loosening the nut O the angle-plate may be properly adjusted to any desired position.

Having thus described my invention, I claim and desire to secure by Letters Patent of the United States—

The combination, with the cross-piece B, having slot C, of the angle-plate D, having wing E, provided with slot I and recess J, and wing F, having flange G, forming a bearing for the shank of a cultivator-blade, the square-headed bolt L, the washer M, having nibs N, and the nut O, as set forth.

In testimony that I claim the foregoing as my own I have hereto affixed my signature in presence of two witnesses.

JOHN WEYMOUTH.

Witnesses:
MYRON J. WEYMOUTH,
S. P. CROSBY.